US005965018A

United States Patent [19]

Caiozza

[11] Patent Number: 5,965,018

[45] Date of Patent: Oct. 12, 1999

[54] IN-LINE METAL PARTICLE REMOVAL AND RETENTION APPARATUS

[76] Inventor: Joseph Caiozza, 321 W. Market St., Long Beach, N.Y. 11561

[21] Appl. No.: 09/080,802

[22] Filed: May 18, 1998

[51] Int. Cl.$^{6}$ .................................................. B01D 35/06

[52] U.S. Cl. .......................... 210/222; 210/222; 184/6.25

[58] Field of Search .................................... 210/222, 223, 210/695, 435; 184/6.25; 123/538

[56] References Cited

U.S. PATENT DOCUMENTS

| | | | |
|---|---|---|---|
| 5,043,063 | 8/1991 | Latimer | 210/222 |
| 5,520,158 | 5/1996 | Williamson | 123/538 |

*Primary Examiner*—David A. Reifsnyder

[57] ABSTRACT

An improved metal particle removal and retention apparatus includes an input end wall which includes a fluid input connector. An output end wall includes a fluid output connector which includes a first connector end and a second connector end. A magnet support housing is connected between the input end wall and the output end wall. The magnet support housing includes an internal housing diameter. The magnet support housing includes one or more external magnet-reception areas. The first connector end of the fluid output connector is contained within the internal fluid reception chamber. The second connector end of the fluid output connector extends out from the output end wall and outside of the internal fluid reception chamber. The fluid input connector extends out from the input end wall and outside of the internal fluid reception chamber. One or more magnets are retained on the external magnet-reception areas. A flow guide is connected to the first connector end of the fluid output connector. The flow guide includes an external guide diameter which is less than the internal housing diameter, whereby a restricted flow space is provided between the magnet support housing and the flow guide. Fluid flowing in the restricted flow space is treated by the magnetic flux of the magnets, and magnet-susceptible particles are trapped by the magnets and removed from the flowing fluid which exits the metal particle removal and retention apparatus. The flow guide includes a plurality of flow reception apertures in communication with the restricted flow space and which preferably have a total effective cross-sectional area equal to or greater than that of the normal engine oil lines with which the apparatus is to be used therefore producing no loss of oil flow pressure or oil flow rate.

19 Claims, 3 Drawing Sheets

FIG 3
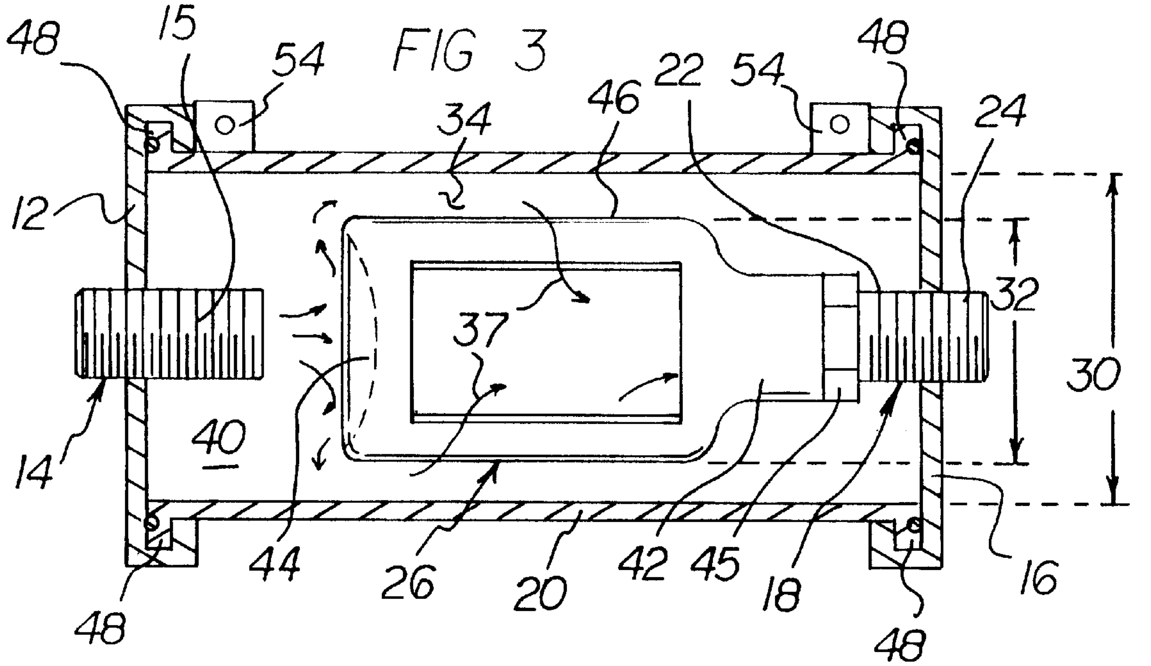
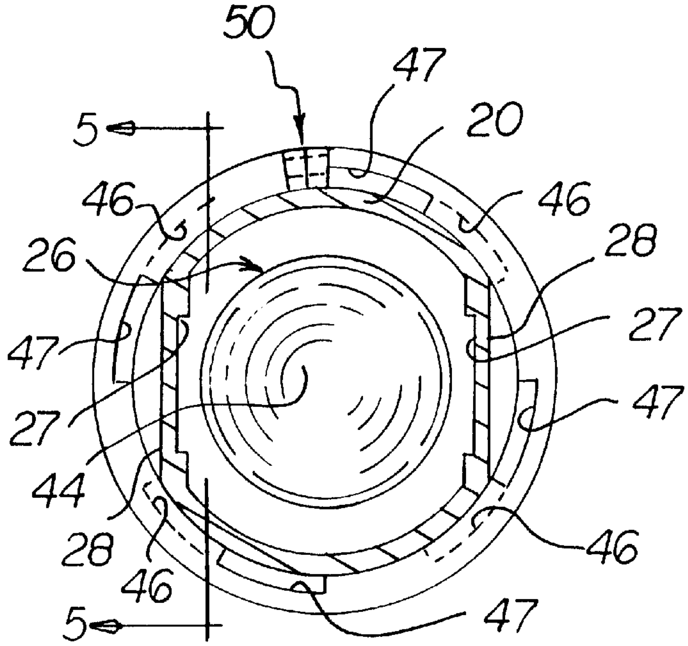
FIG 4

IN-LINE METAL PARTICLE REMOVAL AND RETENTION APPARATUS

BACKGROUND OF THE INVENTION

1. Field of the Invention

The present invention relates generally to fluid clarification systems and, more particularly, to an apparatus especially adapted for removing metal particles from the oil in oil lubrication systems of internal combustion engines.

2. Description of the Prior Art

Magnetic attachments for an oil filter cartridge for an internal combustion engine are generally well known. For example, in my prior Pat. No. 5,273,648, entitled FILTER CARTRIDGE MAGNETIC BELT, I disclose different embodiments of magnetic block assemblies capable of being supported in a circumferentially confronting manner to the wall of a vehicle oil filter canister by means of a flexible belt. Similarly, in my prior U.S. Pat. No. 5,510,024, I disclose, in a similar environment, the use of improved magnetic attachment assemblies characterized by the employment of a shunt element and a heat sink to enhance magnetic filtering efficiency. Additional magnetic attachment assemblies or the like for an oil filter cartridge or canister that eschew separate belt support means, but rely instead on the magnetic force produced by an array of magnets making up the magnetic attachment assembly to maintain the magnetic assembly in confrontational engagement with the filter canister wall, are disclosed in Brunsting's U.S. Pat. No. 5,556,540, entitled MAGNETIC ASSEMBLY FOR A CLOSED PRESSURIZED FLOW PATH OF LUBRICATING OIL.

Although the benefits of using such above-mentioned magnetic attachments for oil filter cartridges are substantial, it may be desirable to provide even greater oil clarification than provided by the prior art magnetic attachment assemblies. In this respect, it would be desirable if the means provided for obtaining such greater clarification were to be relatively simple in construction and more easily manufactured and assembled than is the case with respect to the prior art magnetic attachment assemblies presently contemplated for use with oil filter cartridges.

With a conventional oil filtration system for an internal combustion engine, oil is pumped from an oil pump to a filter cartridge or canister. Particles which are trapped by the filter cartridge inevitably tend to clog the filter causing oil flow to be impeded. To reduce such filter cartridge clogging, it would be desirable if an auxiliary oil filtering device were placed between the oil pump and the filter cartridge.

Once particles are trapped by a filter, there is always a tendency for some of the trapped particles to be dislodged and reenter the oil flow. In this respect, it would be desirable if an oil filtering device were provided that reduces the tendency of trapped particles from becoming dislodged and reentering the oil flow.

For an auxiliary oil filtering device, it would be desirable if means were provided for readily attaching the auxiliary oil filtering device to the body of a motor vehicle.

In a device wherein metal particles in flowing oil are attracted to a magnet, to assure effectiveness of the magnet in attracting the metal particles, it would be desirable if the oil flow were reduced in the flow region wherein the magnetic lines of force of the magnet are most concentrated. The slower the oil flow rate in the region of the magnetic lines of force, the greater effectiveness of the magnet for removing metal particles from the flowing oil.

Some internal combustion engines have hoses or metal lines through which lubricating oil flows. With such internal combustion engines it would be desirable if an auxiliary oil filtering device could be spliced into such an oil hose or metal line through which lubricating oil flows.

An auxiliary oil filtering device, that is used in addition to a filter cartridge, can also employ magnetic means for attracting and retaining metal particles. It is recalled that each of the above-recited U.S. Pat. Nos. 5,273,648, 5,510,024, and 5,556,540, respectively discloses magnetic attachments for oil filter cartridges. In this respect, it would be desirable if an auxiliary oil filtering device could also employ magnetic attachments such as disclosed in these prior art patents by choice of the individual user.

Thus, while the foregoing discussion indicates it to be known in general to use magnetic attachments directly to oil filter cartridges, there is no teaching or suggestion of a metal particle removal and retention apparatus which has the following combination of desirable features: (1) provides for obtaining greater clarification of oil than provided by the prior art magnetic attachments to filter cartridges; (2) provides an auxiliary oil filtering device which is placed between an oil pump and an oil filter cartridge; (3) reduces the tendency of trapped particles from becoming dislodged and reentering the oil flow; (4) provides for readily attaching the auxiliary oil filtering device to the body of a motor vehicle; (5) reduces the oil flow in a flow region wherein the magnetic lines of force of a magnet are most concentrated; (6) provides an auxiliary oil filtering device which can be spliced into an oil hose or metal line through which lubricating oil flows; (7) provides an auxiliary oil filtering device which employs magnetic means for attracting and retaining metal particles; (8) provides an auxiliary oil filtering device which can employ magnetic attachments such as disclosed in U.S. Pat. Nos. 5,273,648, 5,510,024, or 5,556,540; (9) provides an auxiliary oil filtering device which may be opened easily to gain access for inspection and cleaning; (10) provides an auxiliary oil filtering device which dispenses with filter screens or paper filters all of which tend to clog during use; and (11) is relatively simple in construction and is easily manufactured and assembled. The foregoing desired characteristics are provided by the unique metal particle removal and retention apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an improved metal particle removal and retention apparatus for an oil line in an internal combustion engine and includes an input end wall which includes a fluid input connector. An output end wall includes a fluid output connector, and the fluid output connector includes a first connector end and a second connector end. A magnet support housing is connected between the input end wall and the output end wall. The magnet support housing includes an internal housing diameter. The magnet support housing includes one or more external magnet-reception areas. The input end wall, the magnet support housing, and the output end wall define an internal fluid reception chamber. The first connector end of the fluid output connector is contained within the internal fluid reception chamber. The second connector end of the fluid output connector extends out from the output end wall and outside of the internal fluid reception chamber. The fluid input connector extends out from the input end wall and outside of the internal fluid reception chamber. One or more magnets are retained on the external magnet-reception areas.

A flow guide is connected to the first connector end of the fluid output connector. The flow guide includes an external guide diameter which is less than the internal housing diameter, whereby the flow guide is enclosed by the magnet support housing and whereby a restricted flow space is provided between the magnet support housing and the flow guide within the internal fluid reception chamber. The difference between the internal housing diameter and the external guide diameter is relatively small so that the magnetic flux of the magnets effectively treats the oil in the restricted flow space. The flow guide includes a plurality of flow reception apertures which are in communication with the restricted flow space and which have a total effective cross-sectional area equal to or greater than that of the normal engine oil lines with which the invention is to be used therefore producing no loss of oil flow pressure or oil flow rate. The flow guide includes a flow guide output channel.

The external magnet-reception area can be planar for receiving a planar magnet or can be curved (cylindrical) to receive a circumferential magnet or array of magnets. The magnet support housing includes one ore more interior particle retention wells placed opposite the external magnet-reception areas. Preferably, the magnet support housing includes a plurality of external magnet-reception areas, a plurality of magnets, and a plurality of interior particle retention wells.

The first connector end of the fluid output connector is externally threaded, the flow guide output channel is internally threaded, and the flow guide is attached to the first connector end by screwing the flow guide output channel onto the first connector end. The fluid input connector includes an internal input extension portion which extends into the internal fluid reception chamber. The flow guide includes a concave guide end which is located in proximity to the internal input extension portion of the fluid input connector.

The flow reception apertures of the flow guide are located on longitudinal side portions of the flow guide. The magnet support housing is selectively connectable to and removable from the input end wall and the output end wall. Magnet support housing connector means are attached to the input end wall and the output end wall and are employed for selectively connecting and removing the magnet support housing from the input end wall and the output end wall. The magnet support housing connector means include a plurality of flange-reception channels in the input end wall and the output end wall. The magnet support housing includes a plurality of connection flanges that are received in the flange-reception channels.

A pair of clamp assemblies are provided for clamping the magnet support housing to the input end wall and the output end wall. The connection flanges are distributed circumferentially around edges of the magnet support housing. The flange-reception channels are distributed on the input end wall and the output end wall in a circular pattern. The flange-reception channels are registrable with the connection flanges.

Each of the flange-reception channels has a circular length which is at least twice a circular length of a respective connection flange. Each of the flange-reception channels includes an open flange-reception portion for receiving a respective connection flange, and each of the flange-reception channels includes a closed flange reception portion for securing the respective connection flange to the respective input end wall or the respective output end wall.

Each of the clamp assemblies includes a pair of first clamp tangs projecting from the magnet support housing. A pair of second clamp tangs project from the input end wall and the output end wall, wherein each of the first clamp tangs is in registration with a respective second clamp tang when the magnet support housing and the input end wall and the output end wall are connected together with a sealed connection. A pair of clamping bolts are employed for bonding together the first clamp tangs to the respective second clamp tangs to retain the magnet support housing together with the input end wall and together with the output end wall in sealed connections.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved metal particle removal and retention apparatus which has all of the advantages of the prior art and none of the disadvantages.

It is another object of the present invention to provide a new and improved metal particle removal and retention apparatus which may be easily and efficiently manufactured and marketed.

It is a further object of the present invention to provide a new and improved metal particle removal and retention apparatus which is of durable and reliable construction.

An even further object of the present invention is to provide a new and improved metal particle removal and retention apparatus which is susceptible of a low cost of manufacture with regard to both materials and labor, and which accordingly is then susceptible of low prices of sale to the consuming public, thereby making such metal particle removal and retention apparatus available to the buying public.

Still yet a further object of the present invention is to provide a new and improved metal particle removal and retention apparatus which provides for obtaining greater clarification of oil than provided by the magnetic attachments to filter cartridges such as disclosed in U.S. Pat. No. 5,510,024, Still another object of the present invention is to provide a new and improved metal particle removal and retention apparatus that provides an auxiliary oil filtering device which is placed between an oil pump and an oil filter cartridge.

Yet another object of the present invention is to provide a new and improved metal particle removal and retention apparatus which reduces the tendency of trapped particles from becoming dislodged and reentering the oil flow.

Even another object of the present invention is to provide a new and improved metal particle removal and retention apparatus that provides for readily attaching the auxiliary oil filtering device to the body of a motor vehicle.

Still a further object of the present invention is to provide a new and improved metal particle removal and retention apparatus which reduces the oil flow in a flow region wherein the magnetic lines of force of a magnet are most concentrated.

Yet another object of the present invention is to provide a new and improved metal particle removal and retention apparatus that provides an auxiliary oil filtering device which can be spliced into an oil hose or metal line through which lubricating oil flows.

Still another object of the present invention is to provide a new and improved metal particle removal and retention apparatus which provides an auxiliary oil filtering device which employs magnetic means for attracting and retaining metal particles.

Yet another object of the present invention is to provide a new and improved metal particle removal and retention apparatus that provides an auxiliary oil filtering device which can employ magnetic attachments such as disclosed, for example, in U.S. Pat. Nos. 5,273,648, 5,510,024, or 5,556,540.

Still yet another object of the present invention is to provide a new and improved metal particle removal and retention apparatus which provides an auxiliary oil filtering device which may be opened easily to gain access for inspection and cleaning.

Yet another object of the present invention is to provide a new and improved metal particle removal and retention apparatus which provides an auxiliary oil filtering device which dispenses with filter screens or paper filters all of which tend to clog during use.

Yet still another object of the present invention is to provide a new and improved metal particle removal and retention apparatus which provides an auxiliary oil filtering device which is relatively simple in construction and is easily manufactured and assembled.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged cross-sectional view of the embodiment of the invention shown in FIG. 1 taken along line 3—3 thereof.

FIG. 4 is a cross-sectional view of the embodiment of the invention shown in FIG. 2 taken along line 4—4 thereof.

DESCRIPTION OF THE PREFERRED EMBODIMENT

Figure 1:
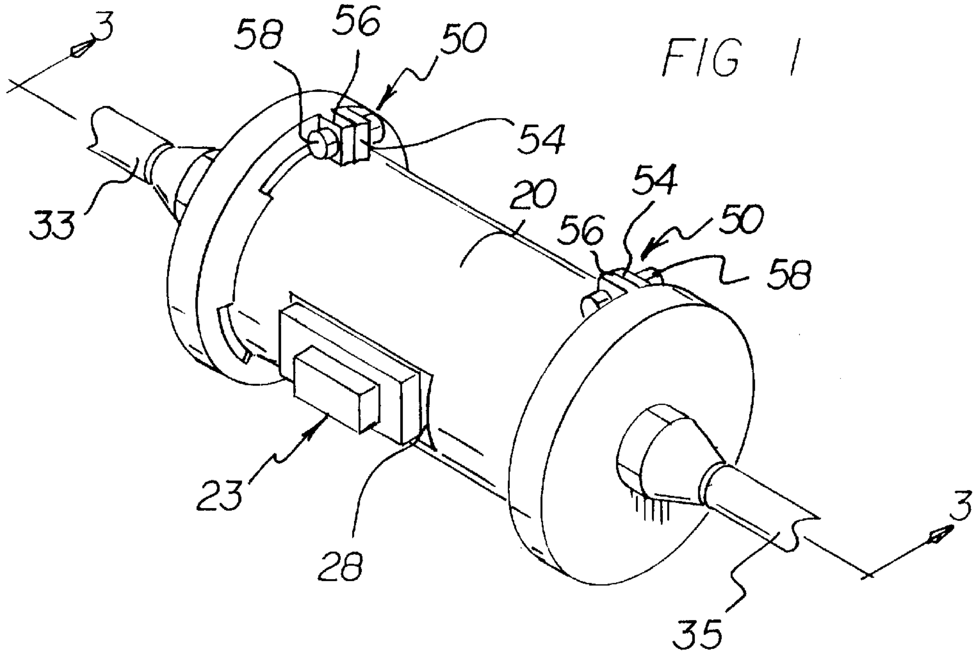
FIG. 1 is a perspective view of a preferred embodiment of the improved metal particle removal and retention apparatus of the invention installed in-line in an oil flow line.
Figure 2:
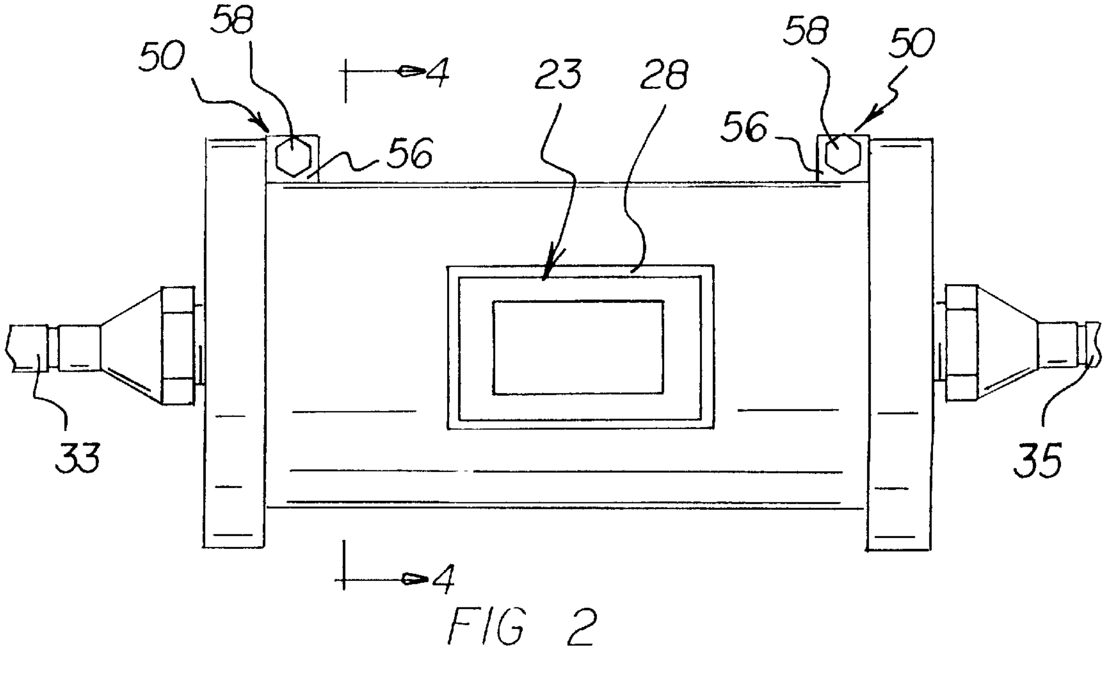
FIG. 2 is an enlarged side view of the embodiment of the invention shown in FIG. 1.
Figure 5:
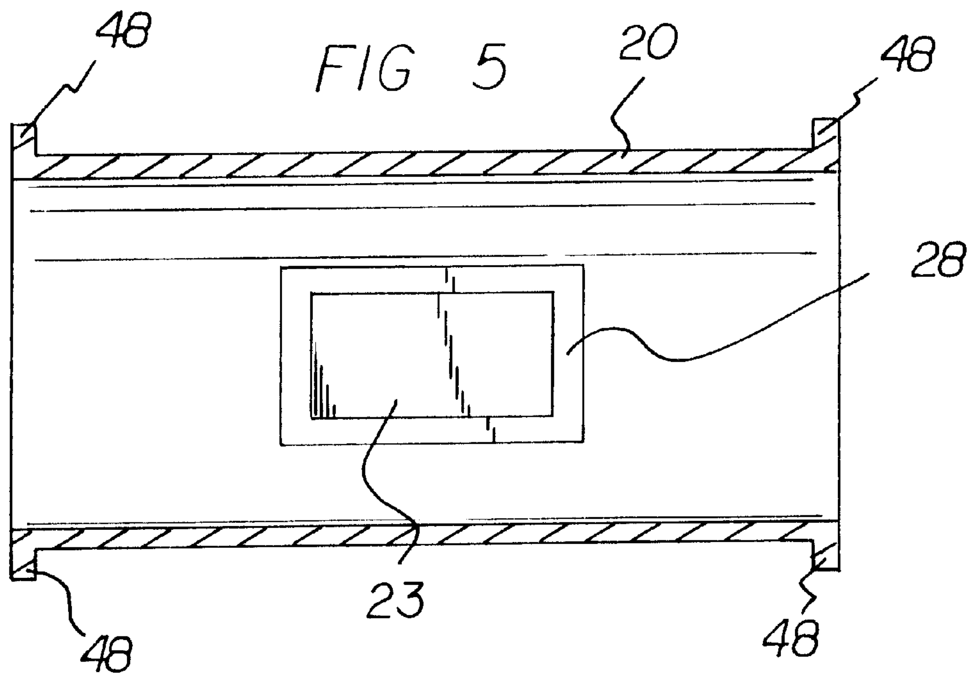
FIG. 5 is a cross-sectional view of the embodiment of the invention shown in FIG. 4 taken along line 5—5 thereof.

With reference to the drawings, a new and improved metal particle removal and retention apparatus embodying the principles and concepts of the present invention will be described.

Turning to FIGS. 1–6, there is shown an exemplary embodiment of the improved metal particle removal and retention apparatus of the invention generally designated by reference numeral 10. In its preferred form, the improved metal particle removal and retention apparatus 10 includes an input end wall 12 which includes a fluid input connector 14. An output end wall 16 includes a fluid output connector 18, and the fluid output connector 18 includes a first connector end 22 and a second connector end 24. A magnet support housing 20 is connected between the input end wall 12 and the output end wall 16. The magnet support housing 20 includes an internal housing diameter 30. The magnet support housing 20 includes one or more external magnet-reception areas 28. The input end wall 12, the magnet support housing 20, and the output end wall 16 define an internal fluid reception chamber 40. The first connector end 22 of the fluid output connector 18 is contained within the internal fluid reception chamber 40. The second connector end 24 of the fluid output connector 18 extends out from the output end wall 16 and outside of the internal fluid reception chamber 40. The fluid input connector 14 extends out from the input end wall 12 and outside of the internal fluid reception chamber 40. One or more magnets 23 are retained on the external magnet-reception areas 28. A flow guide 26 is connected to the first connector end 22 of the fluid output connector 18. The flow guide 26 includes an external guide diameter 32 which is less than the internal housing diameter 30, whereby the flow guide 26 is enclosed by the magnet support housing 20 and whereby a restricted flow space 34 is provided between the magnet support housing 20 and the flow guide 26 within the internal fluid reception chamber 40. The difference between the internal housing diameter 30 and the external guide diameter 32 is relatively small so that the magnetic flux of the magnets 23 effectively treats the oil in the restricted flow space 34. The flow guide 26 includes a plurality of flow reception apertures 38 which are in communication with the restricted flow space 34. The flow guide 26 includes a flow guide output channel 42.

Preferably, the external magnet-reception area 28 is planar for receiving a planar magnets 23; however, it will be appreciated that the magnet-reception area 28 can be curved (cylindrical) to receive a circumferential magnet or array of magnets (not shown) without departing from the principles of the invention in which case, for example, the magnet-reception area merely may be a portion of the outer surface of the magnet support housing 20. The magnet support housing 20 includes one ore more interior particle retention wells 27 placed opposite the external magnet-reception areas 28. Preferably, the magnet support housing 20 includes a plurality of external magnet-reception areas 28, a plurality of magnets 23, and a plurality of interior particle retention wells 27.

The first connector end 22 of the fluid output connector 18 is externally threaded, the flow guide output channel 42 is internally threaded, and the flow guide 26 is attached to the first connector end 22 by screwing the flow guide output channel 42 onto the first connector end 22. The fluid input connector 14 includes an internal input extension portion 15 which extends into the internal fluid reception chamber 40. The flow guide 26 includes a concave guide end 44 which is located in proximity to the internal input extension portion 15 of the fluid input connector 14.

The flow reception apertures 38 of the flow guide 26 are located on longitudinal side portions 46 of the flow guide 26. The magnet support housing 20 is selectively connectable to and removable from the input end wall 12 and the output end wall 16. Magnet support housing connector means are attached to the input end wall 12 and the output end wall 16 and are employed for selectively connecting and removing the magnet support housing 20 from the input end wall 12 and the output end wall 16. The magnet support housing connector means include a plurality of flange-reception channels in the input end wall 12 and the output end wall 16. The magnet support housing 20 includes a plurality of connection flanges 48 that are received in the flange-reception channels.

A pair of clamp assemblies 50 are provided for clamping the magnet support housing 20 to the input end wall 12 and the output end wall 16. The connection flanges 48 are distributed circumferentially around edges of the magnet support housing 20. The flange-reception channels are distributed on the input end wall 12 and the output end wall 16 in a circular pattern. The flange-reception channels are registrable with the connection flanges 48.

Each of the flange-reception channels has a circular length which is at least twice a circular length of a respective connection flange 48. Each of the flange-reception channels includes an open flange-reception portion 47 for receiving a respective connection flange 48, and each of the flange-reception channels includes a closed flange reception portion 46 for securing the respective connection flange 48 to the respective input end wall 12 or the respective output end wall 16.

Each of the clamp assemblies 50 includes a pair of first clamp tangs 54 projecting from the magnet support housing 20. A pair of second clamp tangs 56 project from the input end wall 12 and the output end wall 16, wherein each of the first clamp tangs 54 is in registration with a respective second clamp tang 56 when the magnet support housing 20 and the input end wall 12 and the output end wall 16 are connected together with a sealed connection. A pair of clamping bolts 58 are employed for bonding together the first clamp tangs 54 to the respective second clamp tangs 56 to retain the magnet support housing 20 together with the input end wall 12 and together with the output end wall 16 in sealed connections.

To use the metal particle removal and retention apparatus 10 of the invention, starting from a disassembled condition, the flow guide 26 is attached to the first connector end 22 of the fluid output connector 18. More specifically, the flow guide output channel 42 is screwed onto the first connector end 22 of the fluid output connector 18. A flow guide lock nut 45 can be used to secure the flow guide 26 to the fluid output connector 18. Then, the magnet support housing 20 is moved longitudinally over the flow guide 26, and the connection flanges 48 are inserted into the flange-reception portions 47 of the magnet support housing connector means on the output end wall 16. The magnet support housing 20 is twisted so that the connection flanges 48 move into the longitudinal side portions 46 of the magnet support housing connector means. Thereby, one of the first clamp tangs 54 on the magnet support housing 20 is placed in registration with the second clamp tang 56 on the output end wall 16. Then, a clamping bolt 58, which may also be used with a locking nut, is used to secure the respective first clamp tang 54 and the respective second clamp tang 56 together.

Then, the input end wall 12 is brought up to the other connection flanges 48 on the magnet support housing 20. The other connection flanges 48 are inserted into the flange-reception portions 47 of the input end wall 12, and the input end wall 12 is twisted to move the connection flanges 48 into the longitudinal side portions 46 in the input end wall 12. Thereby, the other first clamp tang 54 on the magnet support housing 20 is placed in registration with the other second clamp tang 56 on the input end wall 12. Then, a clamping bolt 58, which may also be used with a locking nut, is used to secure the respective first clamp tang 54 the respective second clamp tang 56 together. In this way, the metal particle removal and retention apparatus 10 forms an oil-tight filter cartridge. Then, the fluid input connector 14 is connected to an input oil line 33, and the second connector end 24 of the fluid output connector 18 is connected to an output oil line 35. The metal particle removal and retention apparatus 10 preferably is placed in-line in an oil line ahead of a conventional oil filter for an internal combustion engine (not shown).

In operation, once oil enters the fluid input connector 14, the flowing oil flows into the internal fluid reception chamber 40 and bumps into or impinges upon the concave guide end 44 of the flow guide 26 which is placed opposite the internal input extension portion 15 of the fluid input connector 14. Once the oil enters the internal fluid reception chamber 40, its flow rate is slowed down considerably because the internal housing diameter 30 is much greater than the internal diameter of the input oil line 33. The slowed down oil is further slowed down when it impacts the concave guide end 44 of the flow guide 26. The much slowed down oil then enters the restricted flow space 34 between the internal surface of the magnet support housing 20 and the longitudinal side portions 46 of the flow guide 26. Because the difference between the internal housing diameter 30 and the external guide diameter 32 is relatively small, the oil flowing in the restricted flow space 34 is exposed to strong magnetic fields from the magnets 23 installed on the external magnet-reception areas 28 of the magnet support housing 20. The strong magnetic fields cause magnet-responsive particles in the oil to be attracted to the magnets 23. In being attracted to the magnets 23, the particles are pulled into the interior particle retention wells 27 on the inside surface of the magnet support housing 20. Once the oil flows past the interior particle retention wells 27, the treated oil flows through flow reception apertures 38 in the longitudinal side portions 46 into the interior of the flow guide 26 as shown by arrows 37. Then, the treated oil flows into the flow guide output channel 42, into the fluid output connector 18, and out the output oil line 35. In this regard, and in accordance with the present invention, it is preferred that the sum total of the effective cross-sectional area of all flow reception apertures (taken together) is equal to or greater than that of the normal engine oil lines with which the invention is to be used therefore producing no loss of oil flow pressure or oil flow rate.

Figure 6:
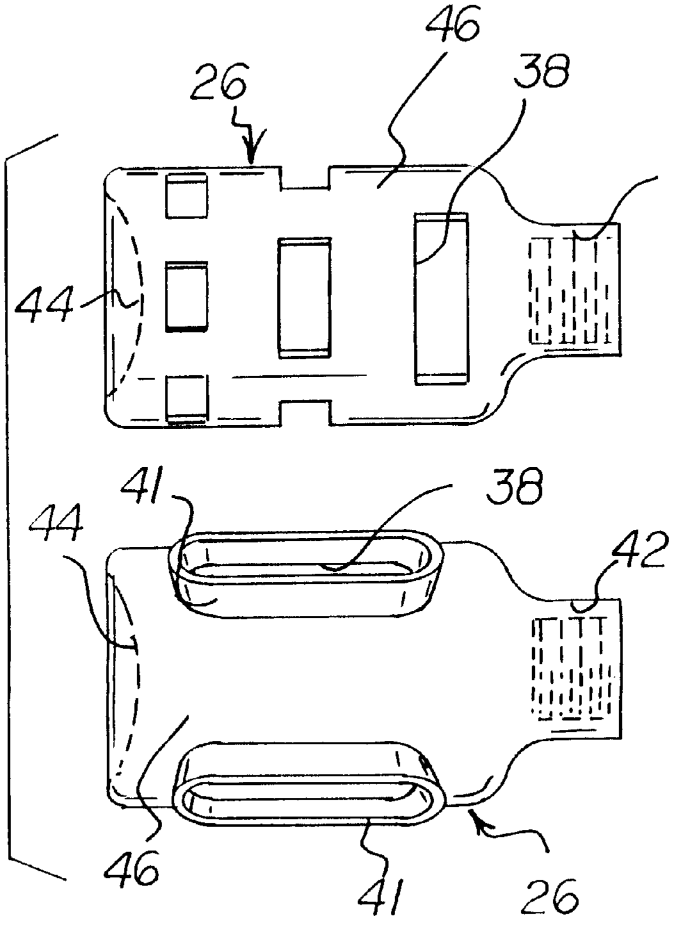
FIG. 6 is a side view of alternate forms of construction of the flow guide portion of the improved metal particle removal and retention apparatus of the invention.

As shown in FIG. 6, the flow guide 26 can have its flow reception apertures 38 distributed in a variety of numbers and patterns. In general, the larger the number and the greater the size of the flow reception apertures 38, the slower the oil flows through the restricted flow space 34. Ideally, the numbers of and the positioning of the external magnet-reception areas 28, the magnets 23, and the interior particle retention wells 27 are such that all of the oil flowing through the metal particle removal and retention apparatus 10 is subjected to magnetic treatment and particle retention.

Furthermore, as illustrated in the bottom flow guide 26 shown in FIG. 6, wall extensions 41 can be located adjacent the flow reception apertures 38 to slow down fluid flow through the flow reception apertures 38.

When it is desired to clean the trapped particles out from the metal particle removal and retention apparatus 10, the assembly procedure described above is done in reverse. Once cleaned, the apparatus of the invention can then be reassembled.

An important feature of the present invention is that in its broadest aspect, the particular structural details of the magnet 23 shown in the drawings hereof do not form any part of the present invention. Any suitable magnet attachment means may be used to carry out the invention. Thus, it will be appreciated that magnet 23 generally represents any suitable known magnetic attachment assembly or means, and therefore, depending upon the particular requirements or choice of the user, such magnet 23 may comprise, for example, any of the magnet attachment assemblies or means disclosed in U.S. Pat. Nos. 5,510,024, 5,273,648, or 5,556,540. In this regard, the specifications of the foregoing prior patents appertaining to such magnet attachment assemblies are hereby incorporated herein by this reference thereto. The terms "magnet attachment assembly" or "magnet attachment means" as used herein means a magnet with or without associated supporting structure such as a band, platform, heat sink, adhesive, clamp, belt or the like.

The components of the metal particle removal and retention apparatus of the invention can be made from inexpensive and durable oil resistant non-magnetic metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved metal particle removal and retention apparatus that is low in cost, relatively simple in design and operation, and which may advantageously be used to provide for obtaining greater clarification of oil than provided by the magnetic attachments to filter cartridges such as disclosed in prior U.S. Pat. Nos. 5,510,024, 5,273,648, or 5,556,540.

With the invention, an improved metal particle removal and retention apparatus provides an auxiliary oil filtering device which is placed between an oil pump and an oil filter cartridge. With the invention, an improved metal particle removal and retention apparatus is provided which reduces the tendency of trapped particles from becoming dislodged and reentering the oil flow. With the invention, an improved metal particle removal and retention apparatus provides for readily attaching the auxiliary oil filtering device to the body of a motor vehicle. With the invention, an improved metal particle removal and retention apparatus is provided which reduces the oil flow in a flow region wherein the magnetic lines of force of a magnet are most concentrated. With the invention, an improved metal particle removal and retention apparatus provides an auxiliary oil filtering device which can be spliced into an oil hose or metal line through which lubricating oil flows. With the invention, an improved metal particle removal and retention apparatus provides an auxiliary oil filtering device which employs magnetic means for attracting and retaining metal particles. With the invention, an improved metal particle removal and retention apparatus provides an auxiliary oil filtering device which can employ magnet attachments such as disclosed in prior U.S. Pat. Nos. 5,510,024, 5,273,648, or 5,556,540. With the invention, an improved metal particle removal and retention apparatus provides an auxiliary oil filtering device which may be opened easily to gain access for inspection and cleaning and which dispenses with filter screens or paper filters all of which tend to clog during use. With the invention, an improved metal particle removal and retention apparatus is provided which is relatively simple in construction and is easily manufactured and assembled.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An improved metal particle removal and retention apparatus, comprising:

an input end wall which includes a fluid input connector, an output end wall which includes a fluid output connector, wherein said fluid output connector includes a first connector end and a second connector end, a magnet support housing connected between said input end wall and said output end wall, wherein said magnet support housing includes an internal housing diameter, wherein said magnet support housing includes and external magnet-reception area, wherein said input end wall, said magnet support housing, and said output end wall define an internal fluid reception chamber, wherein said first connector end of said fluid output connector is contained within said internal fluid reception chamber, wherein said second connector end of said fluid output connector extends out from said output end wall and outside of said internal fluid reception chamber, wherein said fluid input connector extends out from said input end wall and outside of said internal fluid reception chamber, a magnet retained on said external magnet-reception area, a flow guide connected to said first connector end of said fluid output connector, wherein said flow guide includes an external guide diameter which is less than said internal housing diameter, whereby said flow guide is enclosed by said magnet support housing and whereby a restricted flow space is provided between said magnet support housing and said flow guide within said internal fluid reception chamber, wherein said flow guide includes a plurality of flow reception apertures which are in communication with said restricted flow space, wherein said flow guide includes a flow guide output channel.

2. The apparatus of claim 1 wherein said external magnet-reception area is planar for receiving a planar magnet.

3. The apparatus of claim 1 wherein said external magnet-reception area is curvilinear for receiving a curvilinear magnet.

4. The apparatus of claim 1 wherein said magnet support housing includes an interior particle retention well placed opposite said external magnet-reception area.

5. The apparatus of claim 1 wherein said magnet support housing includes a plurality of external magnet-reception areas and a plurality of interior particle retention wells.

6. The apparatus of claim 1 wherein:

said first connector end of said fluid output connector is externally threaded, said flow guide output channel is internally threaded, and said flow guide is attached to said first connector end by screwing said flow guide output channel onto said first connector end.

7. The apparatus of claim 6 wherein said flow guide includes a concave guide end which is located in proximity to said internal input extension portion of said fluid input connector.

8. The apparatus of claim 1 wherein said fluid input connector includes an internal input extension portion which extends into said internal fluid reception chamber.

9. The apparatus of claim 1 wherein said flow reception apertures of said flow guide are located on longitudinal side portions of said flow guide.

10. The apparatus of claim 1 wherein said magnet support housing is selectively connectable to and removable from said input end wall and said output end wall.

11. The apparatus of claim 1, further including:

magnet support housing connector means, attached to said input end wall and said output end wall, for selectively connecting and removing said magnet support housing from said input end wall and said output end wall.

12. The apparatus of claim 11 wherein:

said magnet support housing connector means include a plurality of flange-reception channels in said input end wall and said output end wall, said magnet support housing includes a plurality of connection flanges that are received in said flange-reception channels.

13. The apparatus of claim 12 wherein said flange-reception channels are distributed on said input end wall and said output end wall in a circular pattern, wherein said flange-reception channels are registrable with said connection flanges.

14. The apparatus of claim 13 wherein each of said flange-reception channels includes:

an open flange-reception portion for receiving a respective connection flange, and a closed flange reception portion for securing said respective connection flange to said respective input end wall or said respective output end wall.

15. The apparatus of claim 12 wherein each of said flange-reception channels has a circular length which is at least twice a circular length of a respective connection flange.

16. The apparatus of claim 11 wherein said connection flanges are distributed circumferentially around edges of said magnet support housing.

17. The apparatus of claim 1, further including:

a pair of clamp assemblies for clamping said magnet support housing to said input end wall and said output end wall.

18. The apparatus of claim 17 wherein each of said clamp assemblies includes:

a pair of first clamp tangs projecting from said magnet support housing, a pair of second clamp tangs projecting from said input end wall and said output end wall, wherein each of said first clamp tangs is in registration with a respective second clamp tang when said magnet support housing and said input end wall and said output end wall are connected together with a sealed connection, and a pair of clamping bolts for bonding together said first clamp tangs to said respective second clamp tangs to retain said magnet support housing together with said input end wall and together with said output end wall in sealed connections.

19. The apparatus of claim 1 wherein the total effective cross-sectional area of said plurality of flow reception apertures is equal to or greater than the fluid supply lines to be attached to the fluid input connector and the fluid output connector.

* * * * *